(No Model.)
O. B. THOMPSON.
DEVICE FOR TREADLE MECHANISMS.
No. 328,825. Patented Oct. 20, 1885.
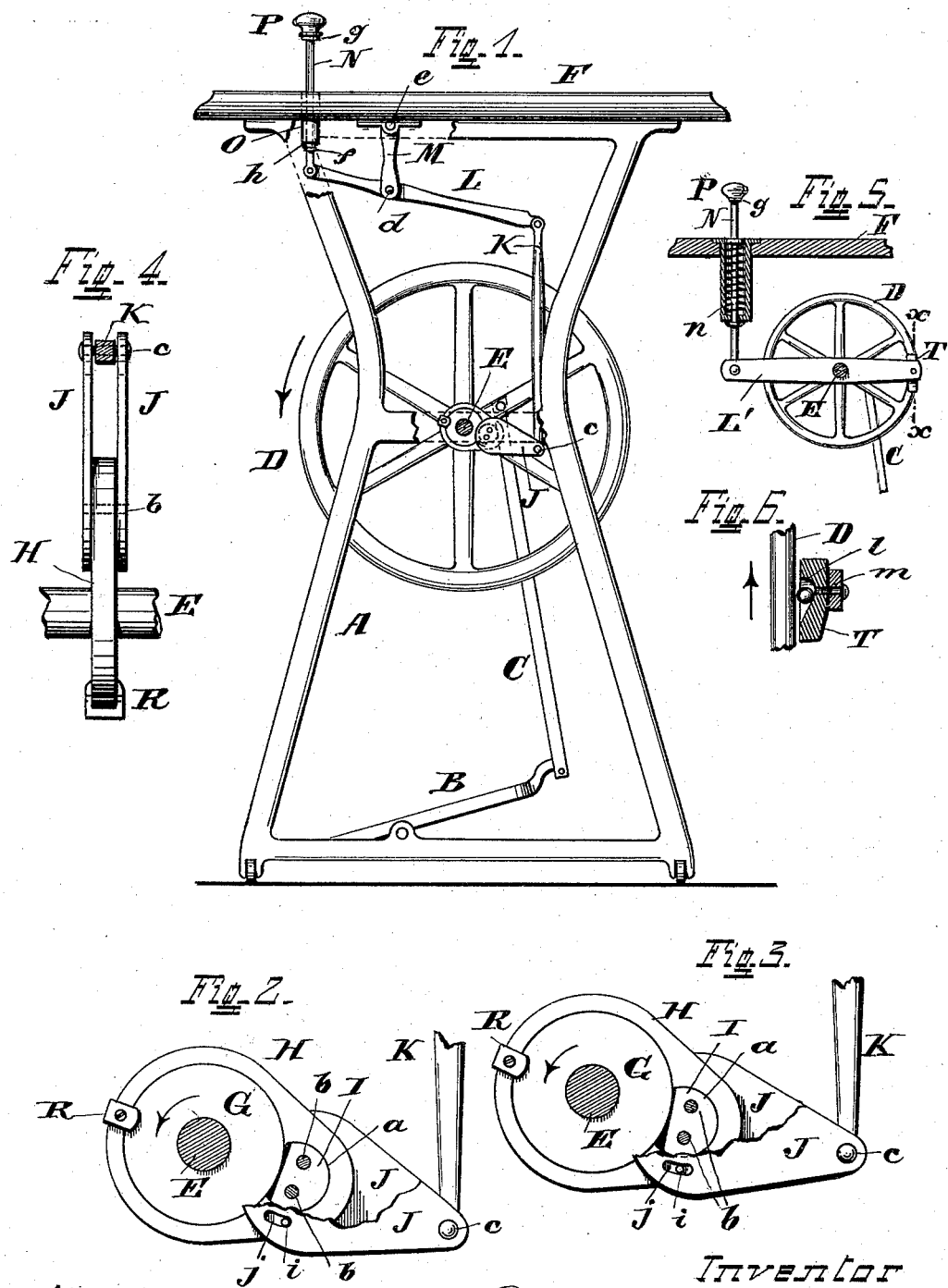

United States Patent Office.

ORRIN B. THOMPSON, OF JERSEY, OHIO.

DEVICE FOR TREADLE MECHANISMS.

SPECIFICATION forming part of Letters Patent No. 328,825, dated October 20, 1885.

Application filed March 24, 1885. Serial No. 159,943. (No model.)

*To all whom it may concern:*

Be it known that I, ORRIN B. THOMPSON, a citizen of the United States, residing at Jersey, in the county of Licking and State of Ohio, have invented certain new and useful Improvements in Devices for Treadle Mechanisms, of which the following is a full, clear, and exact description, reference being had to the accompanying drawings, forming a part of this specification.

My invention relates to improvements in devices for treadle mechanisms of that class where drive and fly wheels are operated by treadles, and has for its object, first, the overcoming of dead-centers without the application of the hands; second, the production of an automatic brake, whereby the fly-wheel is compelled to revolve in the right direction at all times, and, third, in the production of mechanism so connected with the brake that the operator by a pressure of the forearm or elbow can at any time start the machine by converting said brake into a clutch, which engages with the hub of the fly-wheel or a disk connected or formed integral with the hub of said wheel, or, where said wheel is keyed to a revolving shaft, to a disk keyed or otherwise fastened to said shaft or directly to the wheel itself.

The novelty of my invention will be herewith set forth, and distinctly pointed out in the claims.

In the accompanying drawings, Figure 1 is an end elevation of any suitable foot-power treadle-machine, showing the application of my invention. Fig. 2 is an enlarged detail view in elevation of the brake and clutch mechanism in the act of falling back after having been operated to start the wheel. Fig. 3 is a corresponding view showing the positions of the parts in their normal position while the fly-wheel is revolving in the proper direction, and also in such position that the reverse motion of the fly-wheel would at once bring the brake into action to stop it and prevent it from revolving in the wrong direction; also in such position that the action of the elbow mechanism would instantly convert the brake into a positive clutch, and thereby start the wheel in its proper direction. Fig. 4 is a plan view of the combined clutch and brake mechanism. Fig. 5 is a detail view representing a modification in the application of my invention. Fig. 6 is an enlarged detail view in section through the line $x\ x$ of Fig. 5.

The same letters of reference are used to indicate identical parts in all the figures.

A represents the frame-work of any foot-power treadle-machine; B, the treadle; C, the pitman, and D the fly-wheel, in this instance revolving upon a stub-spindle, E, suitably secured to one side of the frame. F is the table of the machine. Secured to the hub of the wheel D, in this instance, is a disk, G, which disk, however, may be part of the hub itself, or, when the fly-wheel is keyed to a shaft, may be independently keyed or otherwise fastened to said shaft. Encircling this disk is a collar, H, which is fitted true to the periphery of the disk, and, if desired, may be in the form of a box inclosing the same. This collar is elongated and recessed, as shown at $a$, to permit the introduction of a combined brake and clutch-piece, I, preferably of steel, which has a flat surface opposed to and in close proximity to the periphery of the disk G.

Secured to the sides of the piece I by screws $b$ or otherwise are coincident arms J, between the rear ends of which are pivoted, as at $c$, the lower end of a link or rod, K, whose upper end, as seen in Fig. 1, is pivoted to the rear end of a lever-arm, L, which in turn is pivoted, as at $d$, to a bracket-arm, M, pivoted, as at $e$, to the frame or to the under side of the table.

The forward end of the lever-arm L has pivoted to it a preferably vertical rod, N, which extends up through a bushing or other suitable guiding-tube, O, passed through and secured to the table. The upper end of this rod N, projecting above the table, is provided with any suitable knob or pressure device, P. Upon the lower end of the rod N is a swell or collar, $f$, to limit the upward play of the rod and the downward play of the arms J; and to prevent noise in the operation of the rod N up and down, rubber or leather cushions $g\ h$, in the form of washers, may be placed under the knob and over the collar $f$, respectively.

To hold the clamping-piece I in such position as to prevent its lower flat portion coming in binding contact with the periphery of the disk G, I secure a pin, *i*, through the collar H, which pin extends through segmental slots *j* in the arms J, said slots and pin being so arranged as to permit sufficient upward play of the arms J to actuate the brake or clutch, but not to permit a further downward play of the arms J, independent of the sleeve H, than is shown in Fig. 2. Where, as in this instance, the carrier H is a sleeve embracing only the periphery of the disk G, the inner ends of the arms J project over the edges of the disk, and, in addition, a clip, R, is employed to embrace the edges of the disk opposite the arms J, thus preventing the sleeve from moving sidewise or getting out of place.

From the above-described construction it will be seen that the fly-wheel D can be driven by the treadle in the direction of the arrow without interfering with or disturbing the clutch or brake mechanism, which remains at rest, with the rod N projected above the table, preferably by the weight of the parts, or, if that is not sufficient, by the aid of any suitable spring. Should the wheel D, however, get upon a dead-center, the operator, whose hands are presumably employed about the operation of the machine, could, with his forearm or elbow, press upon the knob P, thereby pushing down the rod M, tilting the lever L, and so throwing up the arms J as to cause the clamping-piece I to impinge upon the disk G and become sufficiently locked thereto as to start the wheel D revolving again in the right direction.

The adjustment of the parts is, further, such that when the knob P has been depressed to its farthest limit the clutch between the piece I and disk G is broken, and the wheel D can continue its uninterrupted revolution under the action of the treadle. Upon releasing the knob P the parts drop back to their normal position of rest shown in Fig. 1.

Again, should the operator, by means of pressure in the wrong direction upon the pedal, attempt to start the wheel D backward, the carrier H would by gravity at once assume such position as to cause the locking engagement of the clamping-piece I with the periphery of the disk G, thereby at once putting a brake to the wheel and stopping it. If the wheel did not stop upon a dead-center, pressure in the right direction upon the pedal would start the machine; or, if the operator preferred, he could start it, as before stated, by depressing the knob P, thereby indicating to his feet what pressure to give to the pedal. Should it be desired, however, to revolve the wheel D backward for any purpose, this can be done by suitably supporting the carrier H in any manner convenient, whereby it would be prevented from so falling as to lock the brake.

While I have preferably shown and described the clutch and brake mechanism as applied to the fly-wheel of the machine, it is evident that this mechanism could be applied with advantage to any of the driven wheels or shafts of the machine.

I do not, so far as the application of the starting mechanism is concerned, limit myself to the form of clutch described, as there are various well-known forms of clutches that might be used for this purpose; and in Figs. 5 and 6 I have illustrated a modification of my invention, wherein the rod N is pivoted to a lever-arm, L', hung upon the shaft E or hub of the fly-wheel, and having a rear extension, to which is secured a socketed piece, T, in close proximity to the periphery of the fly-wheel D. Within the socket *l* of this piece is secured a gravitating ball, *m*, preferably of rubber, so arranged as to bear against the rim or periphery of the wheel D, and to become wedged therein should the fly-wheel attempt to revolve backward, or should the rod N be operated in such manner as to lock the arm L' to the wheel, either to impart a partial revolution to the wheel in the right direction or to brake it, as will be readily understood. In this latter instance I have shown a spring, *n*, to hold up the arm L' and rod N, though by weighting the rear extension of the arm L' sufficiently this spring may be dispensed with.

Having thus fully described my invention, I claim—

1. In a treadle-machine, a pressure device within reach of the forearm or elbow of the operator, a clutch adapted to engage with the revolving parts of the machine, and connecting mechanism between said pressure device and clutch, whereby the machine can be started in the proper direction by the pressure of the forearm or elbow.

2. In a treadle-machine, a pressure device within reach of the forearm or elbow of the operator, a combined clutch and brake adapted to engage with the revolving parts of the machine, and connecting mechanism whereby the machine is started in the right direction by the operation of said pressure device, and whereby should it be attempted to start it in the wrong direction the brake is brought automatically into action.

3. In a treadle-machine, combined clutch and brake mechanism consisting of a revolving hub, G, the carrier H, and a clamping-piece, I, pivoted thereto, in combination with a pressure device within reach of the forearm or elbow of the operator, and connecting mechanism whereby said clutch can be operated positively by the pressure device to start the machine in the right direction, and whereby should it be attempted to start the machine in the wrong direction the clutch will act automatically as a brake to stop the machine.

4. In a treadle-machine, the combination and arrangement of the rod N, projecting up through the table within reach of the forearm or elbow of the operator, the lever L, swinging bracket-arm M, connecting-rod K, and clutch mechanism adapted to engage with the fly-wheel of the machine, substantially as described.

5. The combination and arrangement of the disk G, carrier H, clamping-piece I, recessed therein, arms J, rigidly secured to said clamping-piece, pin $i$, secured to the carrier and confined in segmental slots in the arms J, and actuating-rod K, substantially as and for the purpose described.

ORRIN B. THOMPSON.

Witnesses:
E. W. RECTOR,
OTTO RICHTER.